United States Patent [19]

Posséme

[11] 4,316,253
[45] Feb. 16, 1982

[54] APPARATUS FOR POSITIONING A BODY BY MEANS OF A MAGNETIC FIELD

[75] Inventor: Gilles Posséme, Paris, France

[73] Assignee: Thomson-CSF, Paris, France

[21] Appl. No.: 94,187

[22] Filed: Nov. 14, 1979

[30] Foreign Application Priority Data

Nov. 17, 1978 [FR] France ............................. 78 32537

[51] Int. Cl.³ .................... G06G 7/70; B63H 25/00
[52] U.S. Cl. .......................... 364/432; 114/144 B; 364/449
[58] Field of Search ............... 364/443, 432, 424, 449; 114/144 B, 264, 311, 293, 294; 318/588; 324/244, 245, 246; 367/15, 16, 19, 21, 131, 134, 141

[56] References Cited

U.S. PATENT DOCUMENTS

| | | | |
|---|---|---|---|
| 3,280,311 | 10/1966 | Shatto, Jr. et al. | 364/432 |
| 3,311,079 | 3/1967 | Berne | 114/144 B |
| 3,500,025 | 3/1970 | Moulin et al. | 364/432 |
| 3,508,512 | 4/1970 | Desrayud et al. | 364/432 X |
| 4,205,379 | 5/1980 | Fox et al. | 364/432 |

*Primary Examiner*—Joseph F. Ruggiero
*Attorney, Agent, or Firm*—Cushman, Darby & Cushman

[57] ABSTRACT

Apparatus for the dynamic positioning of a moving body such as a boat alongside a drilling platform at sea by means of a magnetic field in a plane OXY in which the moving body comprises one or more magnetometers ($m_{100}$), and an apparatus for taking bearings on the angle $\theta$, which a moving reference point O'xy makes with the reference point OXY. The magnetometer ($m_{100}$) measures the components of the magnetic field $H_x$ and $H_y$ in the reference point O'xy, a circuit calculates the components of the field $H_X$ an $H_Y$ in the fixed reference point and other circuits determine the position of the moving body. A circuit prepares control signals for the motor of the moving body from the values of $H_X$ an $H_Y$ and values $X_p$ and $Y_p$ of the position stored in the memory.

8 Claims, 15 Drawing Figures

FIG_1

FIG_5

FIG_3

FIG_4a

FIG_4b

FIG_12

FIG_13

APPARATUS FOR POSITIONING A BODY BY MEANS OF A MAGNETIC FIELD

BACKGROUND OF THE INVENTION

This invention relates to the dynamic positioning of a moving body by means of a magnetic field. The moving body comprises one or more magnetometers providing the components of the magnetic field in the reference mark of this moving body at one or more points of the moving body. The magnetic field is produced by an apparatus connected to the fixed reference marks.

Signals controlling the movement of the moving body are prepared from these magnetic field measurements in order to position the moving body in a specified position.

The invention relates more particularly to ships which are to be immobilised at sea and more particularly alongside a drilling platform. The method consisting of immobilising a ship fitted with propellers correcting the action of the wind, the current and the swell is known as dynamic anchoring.

A known method of dynamic anchoring consists in stretching a cable between the ship and a fixed point on the sea bed and measuring on board the ship the angles of inclination of the cable relative to reference points connected to the ship. From these angular measurements and a measurement of the head of the ship using a gyrocompass, a computer prepares the control signals for the propellers in order to immobilise the ship.

The drawback of this method of dynamic anchoring is that the ship has to be connected to the sea bed by means of a cable.

Another method consists in wetting acoustic beacons fixed to the sea bed and taking up position using the signals emitted by these boundary marks.

This method has the disadvantage of requiring a large infrastructure, which is only justifiable for long-term anchoring. Moreover, the acoustic method is difficult to put into practice owing to environmental noise and the noise of the boat itself.

The same applies to the methods of positioning using radar, which have the particular disadvantage that the signals may be jammed by the presence of other boats also equipped with radar.

Finally, the optical positioning methods have the disadvantage of not being possible in foggy weather and in the presence of smoke.

BRIEF SUMMARY OF THE INVENTION

The present invention remedies all these disadvantages and provides a method of dynamic anchoring without any preliminary manoeuvres, which is advantageous in foggy weather and in rough seas.

Also, when a ship is dynamically anchored in a first position, the invention makes it possible to anchor it dynamically in a second selected position.

According to one feature of the invention, the apparatus for positioning a moving body in a plane marked by the axes OX and OY is characterised in that, connected to the fixed reference points, there are means for producing a magnetic field with components $H_X$ and $H_Y$ on the axes OX and OY, the values of these components being a function of the coordinates X and Y, and that mounted on the moving body are at least a pair of magnetometers measuring the components of the magnetic field $H_x$ and $H_y$ relative to the axes O'x and O'y connected to the moving body, the moving body also comprising means for measuring its angle of orientation $\theta$, the moving bodies having motors for displacing them in the plane OXY, these motors being controlled by signals prepared from the measurement of $H_x$, $H_y$ and $\theta$ and from the values $X_p$, $Y_p$ or $H_x^{(p)}$, $H_y^{(p)}$ stored in a memory, which correspond to the values of the positions or of the fields of the point of equilibrium of the positioning.

BRIEF DESCRIPTION OF THE DRAWINGS

Further features and advantages will become apparent from the description, illustrated by the drawings, wherein.

DETAILED DESCRIPTION OF THE PREFERRED EMBODIMENTS

Figure 1:
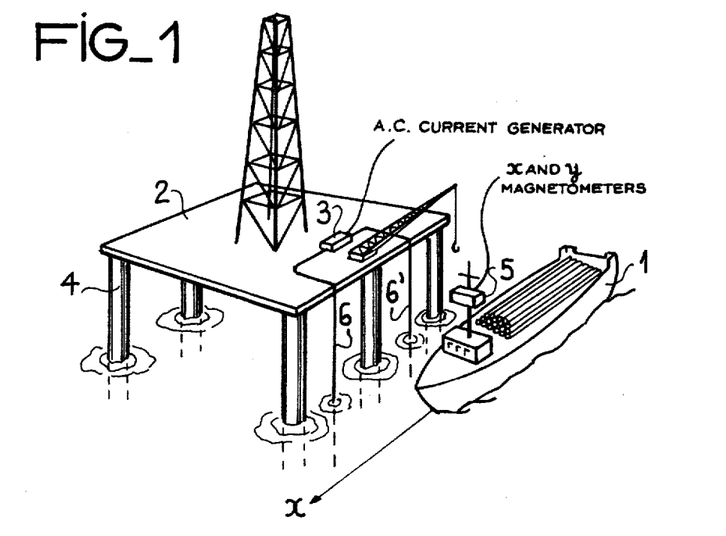
FIG. 1 is a schematic view of a ship dynamically anchored according to the invention.

FIG. 1 diagrammatically shows the dynamic anchoring of a ship 1 according to the invention. A platform 2, assumed to be standing on the sea bed via piers 4, comprises wires 6 and 6' which plunge vertically into the sea, are connected at their lower ends and carry an alternating current of intensity i supplied by a generator 3. In certain cases, moreover, the sea itself may be used to close the circuit.

Similarly, the sea may be used to close the circuit of a single wire plunging vertically downwards, whilst the return is at a sufficiently distant point so that the magnetic field is not regarded as being produced by a single wire.

Taking the coordinate axes OX and OY connected to the platform, at the point of the X and Y coordinates the alternating magnetic field on these axes will have $h_X$ and $h_Y$ components such that:

$$h_X = H_X \sin 2\pi ft \quad (1)$$

and $$h_Y = H_Y \sin 2\pi ft$$

where f is the frequency of the current producing this magnetic field and t is the time, $H_X$ and $H_Y$ are the amplitudes of the components of the magnetic field, which will hereinafter be referred to as "components," for the sake of simplicity.

The boat 1 comprises magnetometers 5 which measure the components of the magnetic field $H_x$ and $H_y$ in relation to the axes x and y connected to the boat.

These measured values are the ones used to control the dynamic anchoring of the boat.

In some cases, the values of $H_X$ and $H_Y$ can be calculated directly from the values of X and Y and conversely, if $H_X$ and $H_Y$ are known, the corresponding coordinates can be calculated.

If, for example, the lengths S of the wires 6 can be regarded as infinite in relation to the distance R between the platform and the boat and, moreover, if the distance E between the wires 6 can also be regarded as infinite in relation to R, we have the following simple equations between the coordinates and the components of the field:

$$X = H_X I/(2\pi H^2) \text{ and} \quad (2)$$
$$Y = H_Y I/(2\pi H^2) \text{ with}$$
$$i = I \sin 2\pi f t \text{ and}$$
$$H^2 = H_X^2 + H_Y^2$$

It will be appreciated that in this case, if $H_X$ and $H_Y$ are known, the coordinates X and Y can be calculated, the origin being located on the wire 6 producing the measured field.

If the two wires 6 and 6' are not very far apart the equations (2) are replaced by rather more complicated known terms. The same is true if R becomes great in relation to S.

If the frequency f used exceeds 1000 Hz, the analytical equations between the components of the magnetic field and the coordinates become more complicated, owing to the dielectric losses in the water of the "skin effect" type. In this case, it may be preferable to obtain the functions $X(H_X, H_Y)$ and $Y(H_X, H_Y)$ directly experimentally, in order to place them in memories.

In the preferred embodiment of the invention, positioning is effected by means of an alternating magnetic field which is detected by magnetometers located on board the ship and tuned to the frequency f. Thus, only the magnetic field produced is detected, and not any parasitic magnetic fields, especially those produced by the earth's magnetic field and those produced by metal objects. Moreover, it is advantageous for f to be as different as possible from the harmonics of the main frequency of 50 Hz or 60 Hz.

It is known to measure alternating magnetic fields in a 10 Hz band with a precision of $3 \times 10^{-3} \gamma$ or $2.4 \times 10^{-6}$ A/m in M.K.S.A. units.

Operation at a frequency of about 300 Hz produced a magnetic field of $0.3\gamma$ or $2.4 \times 10^{-4}$ A/m for an effective current of 700 mA with a signal-to-noise ratio of 40 dB at a distance of 50 m.

In order to measure the two horizontal components of the magnetic field, it is known to use two magnetometers placed at 90° relative to each other. The magnetometers used may be of the flux-metric coil type, for example.

Figure 5:
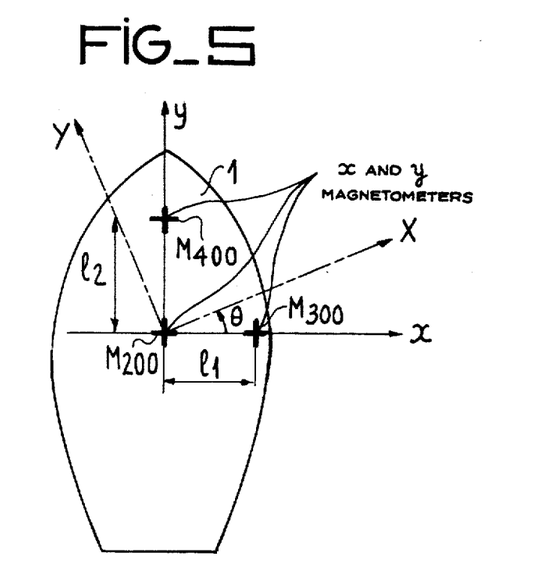
FIG. 5 is a diagram of a ship fitted with 3 pairs of magnetometers for determining local variations in field in the moving reference.

In order to calculate these components in the fixed axes which are generally parallel to the geographical axes, it is necessary to know the head angle $\theta$, where $\theta$ is the angle between the axes x and X (FIG. 5).

The change of coordinate equations are:

$$H_X = H_x \cos \theta - H_y \sin \theta \quad (3)$$
$$H_Y = H_x \sin \theta + H_y \cos \theta$$

Consequently, if one knows the components $H_x$, $H_y$ and the head and the equations which link the components $H_X$ and $H_Y$ to the fixed coordinates X and Y (for example equation (2) for an infinite vertical wire), the values of the fixed coordinates of a boat can be determined.

In order to determine the relative signs of $h_x$ and $h_y$ in equation (1), $h_y$ is demodulated by $h_x$, for example. There may still be an ambiguity owing to the fact that the sign is not known in relation to the instantaneous current. In practice, any doubt is removed by roughly knowing the position of the boat in relation to the platform.

Figure 2A:
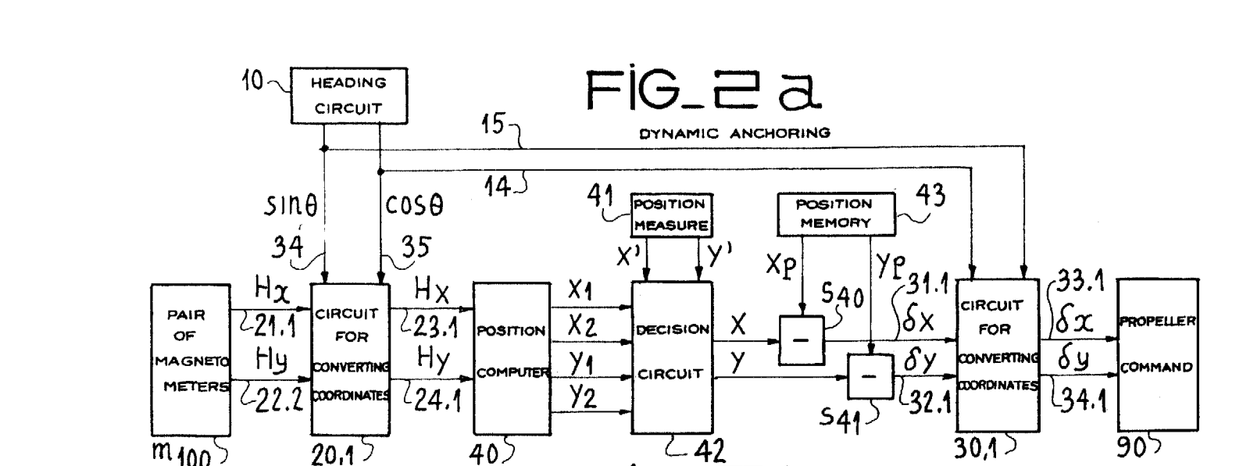
FIGS. 2a and 2b are block diagrams of a dynamic anchoring apparatus in a selected position according to the invention.

FIG. 2a shows a diagram of dynamic anchoring according to the invention.

The pair of magnetometers $m_{100}$ supplies the components $H_x$ and $H_y$ at 21.1 and 22.1, respectively.

The calculating circuit 20.1 receives at its inputs the values of $H_x$ and $H_y$ on the one hand and the values of sin $\theta$ and cos $\theta$ at 34 and 35. The circuit 20.1 provides, at its outputs 23.1 and 24.1, the values of the components in the fixed reference mark $H_X$ and $H_Y$ according to equation (3).

A circuit 40 receives at its inputs the values of $H_X$ and $H_Y$ and supplies at its outputs pairs of values of the fixed coordinates $X_1$, $Y_1$ and $Y_2$, $Y_2$. These multiple values may be due to the uncertainty as to the sign of the instantaneous values of the components $h_X$ and $h_Y$, which may cause ambiguity in the calculation of the components by the circuit 40. This circuit either determines $X(H_X, H_Y)$ and $Y(H_X, H_Y)$ by an analytical equation or else contains these functions in its memory.

The doubt can be removed by the decision circuit 42, by a knowledge of approximate values for the coordinates X' and Y' supplied by the circuit 41. This decision circuit 42 also receives the values of the pairs $X_1$, $Y_1$ and $X_2$, $Y_2$ and delivers the values of the coordinates X and Y.

The circuit 41 receives the values of X' and Y' either manually or from a navigation computer.

A memory circuit 43 contains the values of the desired positioning coordinates $X_p$ and $Y_p$.

The subtraction circuits $S_{40}$ and $S_{41}$ provide, at 31.1 and 32.1, the values $\delta X = X - X_p$ and $\delta Y = Y - Y_p$.

A calculating circuit 30.1 makes it possible to go from the values $\delta X$ and $\delta Y$ to the values of the mobile coordinate corrections $\delta x$ and $\delta y$, the circuit 30.1 receiving the values of sin $\theta$ and cos $\theta$ at its inputs, 15 and 14.

Finally, the error signals $\delta x$ and $\delta y$ are applied to the device 90 which corrects the position of the boat using known methods.

Figure 2B:
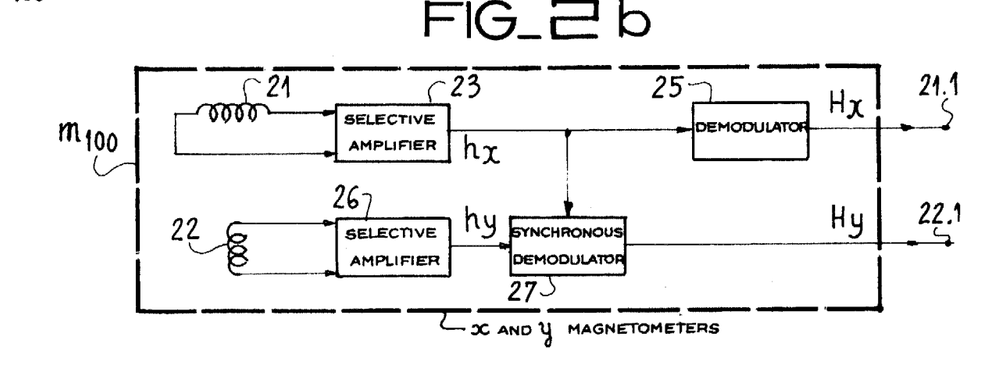

FIG. 2b shows details of the pair of magnetometers $m_{100}$. The detection coils 21 and 22 are sensitive to the components along x and y. The circuits 23 and 26 are selective amplifiers for the frequency f, 25 is a demodulating circuit providing $H_x$ at 21.1. The circuit 27 is a synchronous demodulator of $h_y$ by $h_x$ and $H_y$ is obtained at 22.1.

Figure 3:
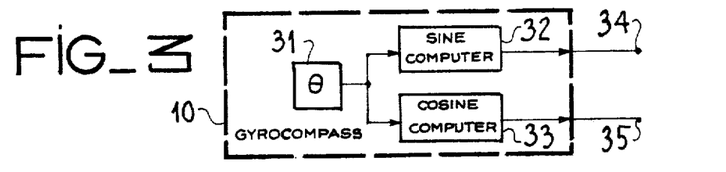
FIG. 3 is the head information circuit.

The device 10 in FIG. 2a is shown in FIG. 3. A gyrocompass 31 gives the value of the head $\theta$ relative to the geographical coordinates and the circuits 32 and 33 calculate the values of sin $\theta$ and cos $\theta$ obtained at the outputs 34 and 35.

Figure 4A:
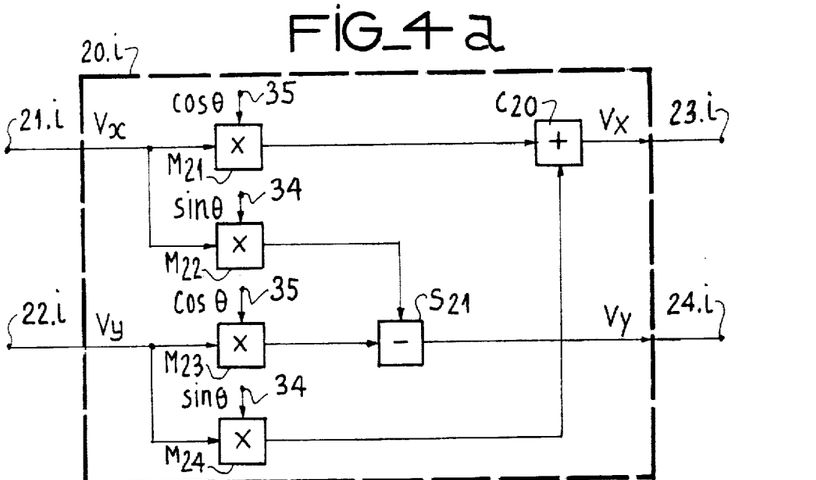
FIGS. 4a and 4b show the coordinate changing circuits.
Figure 4B:
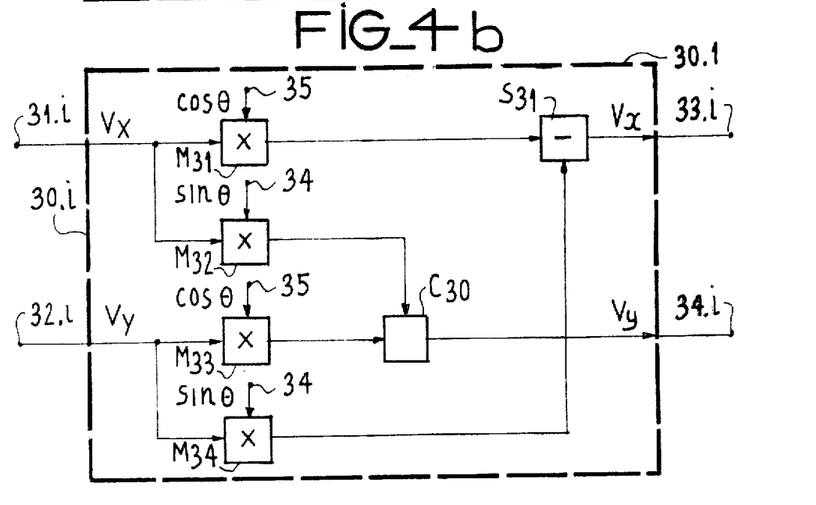

The coordinate changing circuits 20.1 and 30.1 in FIG. 2a are shown in FIGS. 4a and 4b. The circuit such as 20.1 (FIG. 4a) carries out the operation given by equation (2), receiving the values of sin $\theta$ and cos $\theta$ at 34 and 35.

The values of the components of a vector $\vec{V}$ with coordinates x and y, $V_x$ and $V_y$ come in at 21.1 and 22.1. The values of the components of V with fixed coordinates $V_X$ and $V_Y$ are delivered at the outputs 23.1 and 24.1. The circuit 20.1 comprises multiplication circuits $M_{21}$, $M_{22}$, $M_{23}$ and $M_{24}$, the addition circuit $C_{20}$ and the subtraction circuit $S_{21}$.

The reverse operation consisting in going from the components $V_X$ and $V_Y$ to the components $V_x$ and $V_y$ of a vector $\vec{V}$ is shown by the circuit 30.1 in FIG. 4b.

It comprises multiplication circuits $M_{31}$, $M_{32}$, $M_{33}$ and $M_{34}$, an addition circuit $C_{30}$ and a subtraction circuit $S_{31}$.

According to an alternative embodiment of the invention, three magnetometers x and y such as the one shown in FIG. 2b are placed on the boat 1 (FIG. 5). The first $M_{200}$ is placed at the origin of the moving coordinates, the second $M_{300}$ has the coordinates $x = l_1$, $y = 0$ and the third $M_{400}$ has the coordinates $x = 0$, $y = l_2$.

Thus, one has the local variations of the components of the magnetic field and hence the partial derivatives of these components in the moving reference mark. Therefore, if the values of these components of the field in the desired position are known, the correction values can be deduced from the deviations relative to the values of the components measured.

The magnetometer $M_{200}$ gives the values of the components $H_x^{(0)}$ and $H_y^{(0)}$, the magnetometer $M_{300}$ gives the values $H_x^{(1)}$ and $H_y^{(1)}$ and the magnetometer $M_{400}$ gives the values $H_x^{(2)}$ and $H_y^{(2)}$.

Thus, an approximate value for the partial derivatives $\partial H_x/\partial x$, $\partial H_x/\partial y$, $\partial H_y/\partial x$ and $\partial H_y/\partial y$ is obtained from the equations:

$$\frac{\partial H_x}{\partial x} = \frac{H_x^{(1)} - H_x^{(o)}}{l_1} = A_1 \quad (4)$$

$$\frac{\partial H_x}{\partial y} = \frac{H_x^{(2)} - H_x^{(o)}}{l_2} = B_1$$

$$\frac{\partial H_y}{\partial x} = \frac{H_y^{(1)} - H_y^{(o)}}{l_1} = A_2$$

and $$\frac{\partial H_y}{\partial y} = \frac{H_y^{(2)} - H_y^{(o)}}{l_2} = B_2$$

With a displacement of the boat expressed in coordinates x, y; $\delta x$ and $\delta y$ correspond to a variation in the components of the magnetic field $\delta H_x$ and $\delta H_y$ such that:

$$\delta H_x = A_1 \delta x + B_1 \delta y \quad (5)$$
$$\text{and}$$
$$\delta H_y = A_2 \delta x + B_2 \delta y$$

Conversely, knowing $\delta H_x$ and $\delta H_y$, $\delta x$ and $\delta y$ can be calculated from the equations:

$$\delta x = a_1 \delta H_x + b_1 \delta H_y \quad (6)$$
$$\delta y = a_2 \delta H_x + b_2 \delta H_y$$

and from (5) one deduces that $a_1 = B_2/J$, $b_1 = -B_1/J$, $a_2 = -A_2/J$ and $b_2 = A_2/J$ where $J = A_1 B_2 - A_2 B_1$.

Figure 6:
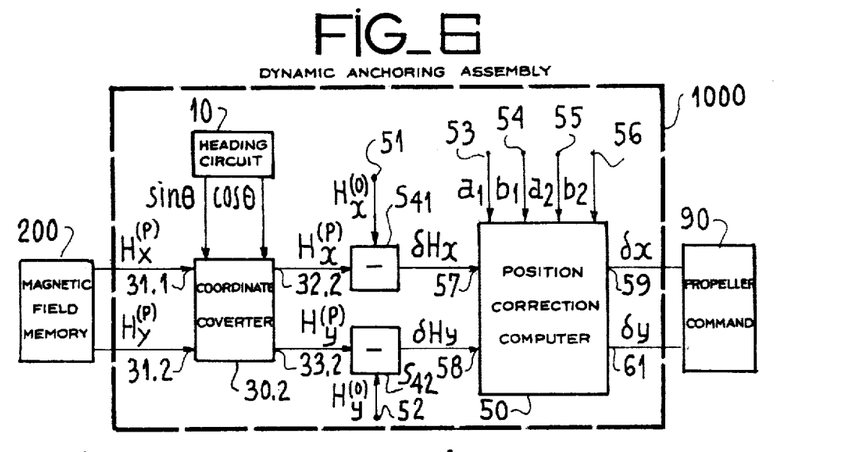
FIG. 6 shows a diagram of dynamic anchoring using measurements of the variation in the magnetic field.

The calculation of the corrections $\delta x$ and $\delta y$ by equation (6) is used in the dynamic anchoring assembly 1000 in FIG. 6.

A position of equilibrium is fixed by the values memorized at 200 of the components of the field $H_x^{(p)}$ and $H_y^{(p)}$ in the fixed reference point. The coordinate changing circuit 30.2 receives these components at 31.1 and 31.2, together with the values of sin $\theta$ and cos $\theta$.

The values obtained for the field components $H_x^{(p)}$ and $H_y^{(p)}$ in the moving reference point are applied to the subtraction circuits $S_{41}$ and $S_{42}$, which receive at 51 and 52, respectively, the values $H_x^{(o)}$ and $H_y^{(o)}$, thus giving $\delta H_x = H_x^{(p)} - H_x^{(o)}$ and $\delta H_y = H_y^{(p)} - H_y^{(o)}$.

The calculating circuit 50 receives these values $\delta H_x$ and $\delta H_y$ at 57 and 58 and also receives the values $a_1$, $b_1$, $a_2$ and $b_2$ at 53, 54, 55 and 56. By carrying out the calculation of equation (6) the circuit 50 supplies the values $\delta x$ and $\delta y$ at 59 and 61 to the position correcting system 90.

Figure 7:
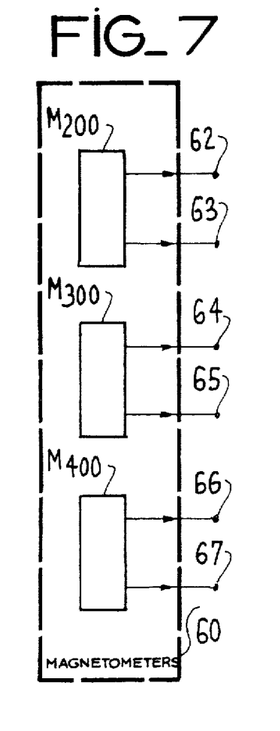
FIG. 7 shows a diagram of the mounting of the pairs of magnetometers.

FIG. 7 shows the magnetometers $M_{200}$, $M_{300}$ and $M_{400}$ with their outputs 62, 63, 64, 65, 66 and 67 supplying the components $H_x^{(o)}$, $H_y^{(o)}$, $H_x^{(1)}$, $H_x^{(1)}$, $H_x^{(2)}$ and $H_y^{(2)}$. These values are applied to the circuit for calculating the partial derivatives $A_1$, $B_1$, $A_2$ and $B_2$; 250, shown in FIG. 8.

Figure 8:
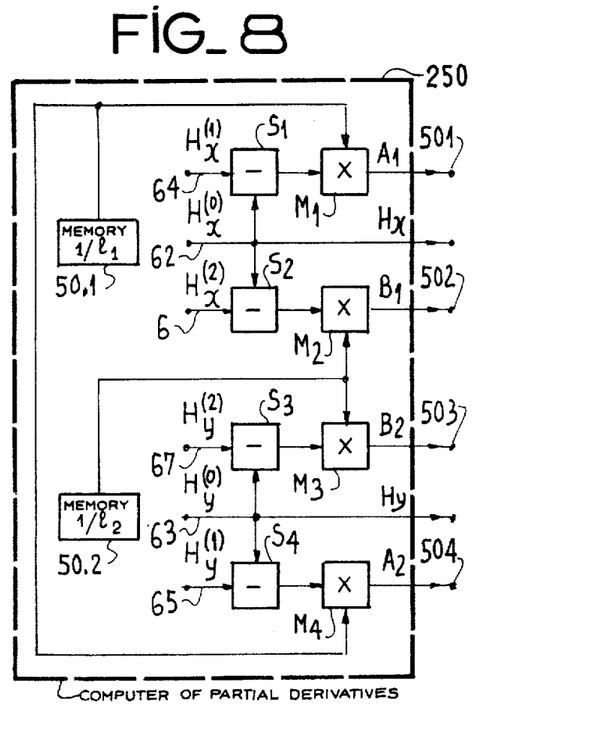
FIG. 8 is a diagram of the circuits for calculating local partial derivatives of the magnetic field in relation to the moving coordinates.

The calculation is that of equation (5). The values $1/l_1$ and $1/l_2$ are memorised at 50.1 and 50.2; $S_1$, $S_2$, $S_3$ and $S_4$ are subtraction circuits; $M_1$, $M_2$, $M_3$ and $M_4$ are multiplication circuits. The values of $A_1$, $B_1$, $B_2$ and $A_2$ are obtained at the outputs 501, 502, 503 and 504.

Figure 9:
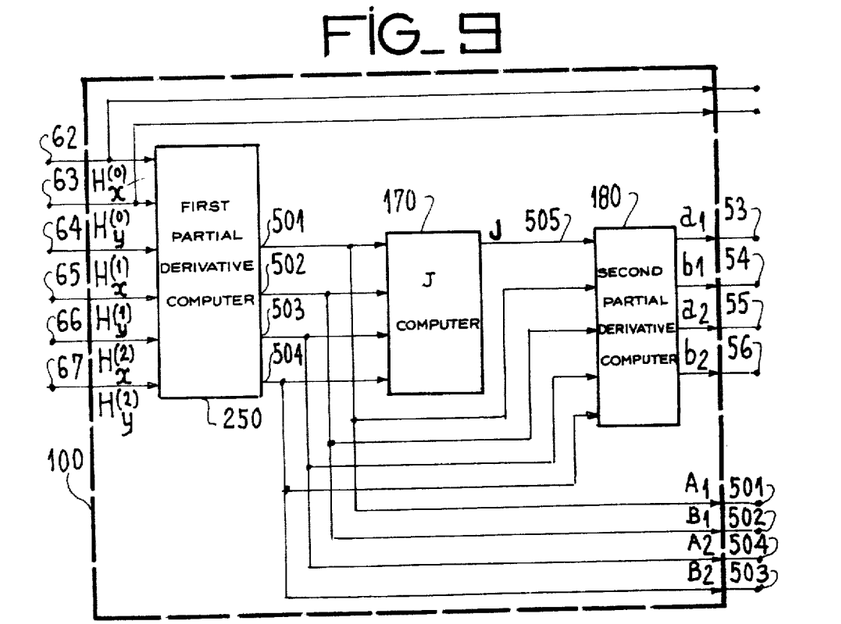
FIG. 9 is a diagram of the circuits for calculating local partial derivatives of the variations in position relative to the magnetic field.

The circuit 100 for calculating the partial derivatives $a_1$, $b_1$, $a_2$ and $b_2$ according to equation (6) is shown in FIG. 9. The value of J is calculated by the circuit 170 from the values $A_1$, $B_1$, $A_2$ and $B_2$ supplied by the circuit 250 and finally the circuit 180 receiving these values and the value J delivers the values $a_1$, $b_1$, $a_2$ and $b_2$ at 50, 54, 55 and 56.

Figure 10:
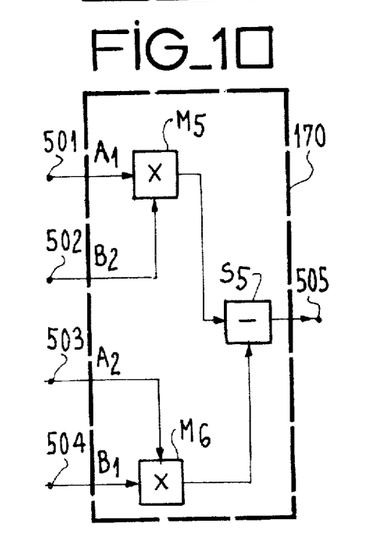
FIGS. 10, 11 and 12 show details of the diagram in FIG. 9.

The circuit 170 is shown by FIG. 10.

It receives at its inputs 501, 502, 503 and 504 the values $A_1$, $B_1$, $B_2$ and $A_2$ and supplies the value J at its output 505. It comprises the multiplier circuits $M_5$ and $M_6$ and the subtractor circuit $S_5$.

Figure 11:
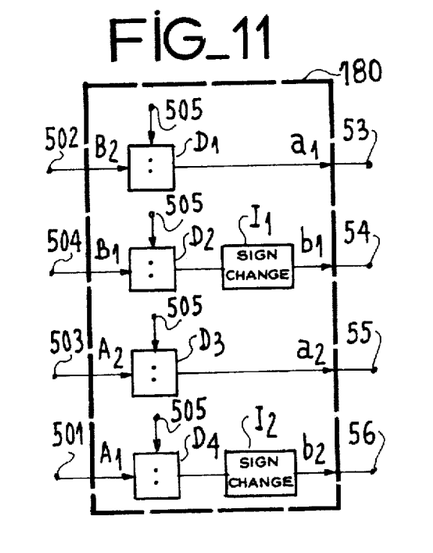

The elements of the calculating circuit 180 are shown in FIG. 11. At its inputs 501, 502, 503 and 504, it receives the values $A_1$, $B_2$, $A_2$ and $B_1$ and at 505 it receives the value J.

The circuits $D_1$, $D_2$, $D_3$ and $D_4$ carry out division and at the output of the circuit 180 the values of $a_1$, $b_1$, $a_2$ and $b_2$ are obtained at 53, 54, 55 and 56. The circuits $I_1$ and $I_2$ are inverters which change the sign.

Figure 12:
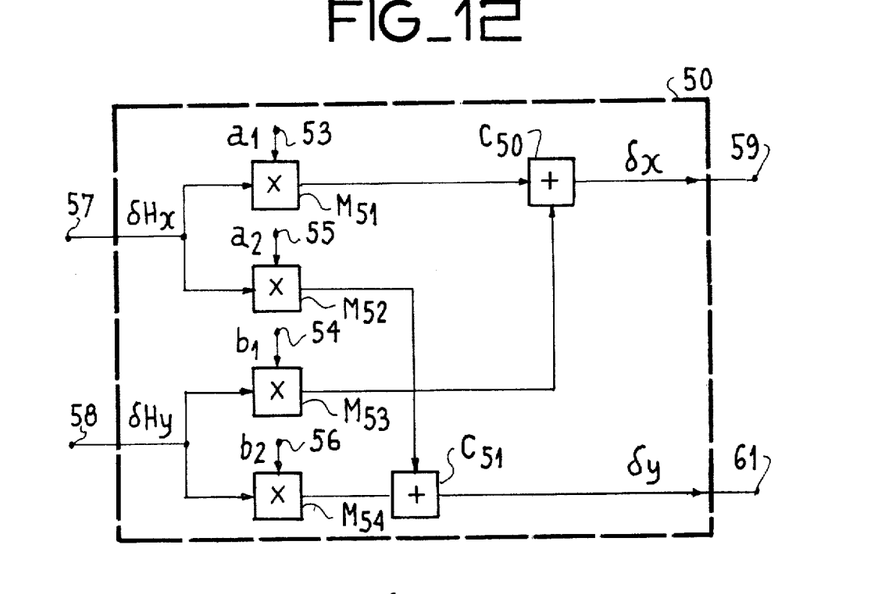

The calculating circuit 50 in FIG. 8 is shown in FIG. 12.

At its imputs 57 and 58 it receives the values of $\delta H_x$ and $\delta H_y$ and at its outputs 59 and 61 it supplies the values of $\delta x$ and $\delta y$ according to equation (6).

The circuit 50 receives the values of $a_1, a_2, b_1$ and $b_2$ at 53, 55, 54 and 56. It comprises multiplier circuits $M_{51}, M_{52}, M_{53}$ and $M_{54}$ and the adding circuits $C_{50}$ and $C_{51}$.

According to a variant of the invention, it is possible, when dynamically anchored at a point $P_o$, to change position in order to anchor dynamically at another point $P'$, knowing the differences between the coordinates $\Delta X$ and $\Delta Y$ of the points $P'$ and $P_o$.

To make the linear equations (5) and (6) valid, $\Delta X$ and $\Delta Y$ are divided into N steps $\delta X_1$ and $\delta Y_1$ so that:

$$\delta X_1 = \Delta X/N \text{ and } \delta Y_1 = \Delta Y/N.$$

The ship will pass successively the points $P_o, P_1, P_2, \ldots P_i, \ldots P_{N-2}, P'$, a calculating circuit determines the field variations $\delta H_x$ and $\delta H_y$ between the points $P_{i-1}$ and $P_i$ with a dynamic anchoring at point $P_i$ by the method shown on FIG. 8. Thus, the advance occurs substantially along a straight line up to point $P'$ after N steps have been carried out.

Figure 13:
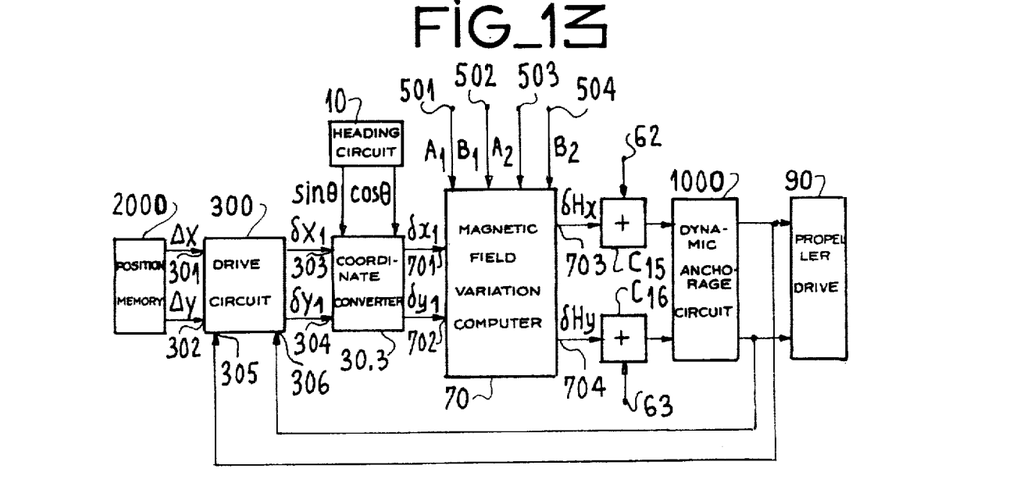
FIG. 13 is a diagram of a dynamic anchoring apparatus in a new position after dynamic anchoring in a first position.

FIG. 13 diagrammatically shows the apparatus. The values $\Delta X$ and $\Delta Y$ of the displacement to be effected are memorized at 2000 and transmitted to the control circuit 300. This circuit calculates the number of steps N and $\delta X_1$ and $\delta Y_1$ so that $\delta X_1 < e$ and $\delta Y_1 < e$, e being the maximum length for the linear approximations of equations (5) and (6).

At its output the circuit 300 provides a command for the steps to be carried out, at 303 and 304. The circuit 303, which is analogous to the circuit in FIG. 4b, supplies the values for the step $\delta x_1$ and $\delta y_1$ in the moving coordinates.

The calculating circuit 70, which is analogous changing input and output, to the circuit 50 in FIG. 12, receives at its inputs 701 and 702 the values of $\delta x_1$ and $\delta y_1$, and at its inputs 501, 502, 503 and 504 the values of the partial derivatives $A_1, B_1, A_2$ and $B_2$. The circuit 70 provides at its outputs the values of $\delta H_x$ and $\delta H_y$, by the calculation according to equation (5). The value of the field component $H_x^{(o)}$ is applied to an input 62 of an adding circuit $C_{15}$ and the value of $\delta H_x$ is applied to another input 703. Similarly, the adding circuit $C_{16}$ receives at its inputs 704 and 63 the values of $H_y^{(o)}$ and $\delta H_y$. The circuit 1000 in FIG. 6 receives at its inputs the values of the components of the step according to $H_x^{(o)} + \delta H_x$ and $H_y^{(o)} + \delta H_y$, and the corrections are applied to the circuit 90. When the boat is moved by one step, the corrections applied to the circuit 90 are cancelled out. These corrections are applied at 305 and 306 to the control circuit 300 which sends the signals which initiate the steps. The circuit 300 contains step counters which deliver a stop signal when point $P'$ is reached.

It must be noticed that to reduce the influence of the "skin effect" by the sea on the magnetic field, to place the magnetometers well above the sea level.

Thus, an apparatus for positioning a moving body by measurement of a magnetic field is described; this apparatus may be used for the dynamic anchoring of a boat in relation to a drilling platform at sea, but it may also apply to any other moving body which has to be positioned, for construction work, agricultural purposes or inside a factory.

The invention is not limited to the embodiments described and various modifications can be made thereto without passing beyond the scope of the invention.

What is claimed is:

1. An apparatus for positioning a moving body at a desired X and Y location in a plane referenced by axis OX and OY comprising:

fixed magnetic field producing means including an electrical generator for producing an alternating current at frequency f in at least one conductor wire rectilinear and perpendicular to the plane OXY, the current flow in said wire producing a magnetic field with components $Hx$ and $Hy$ along axes X and Y; and wherein on said moving body are mounted:

at least one pair of magnetometers for measuring the amplitude of the components of said magnetic field on mobile axis $O'x$ and $O'y$;

orientation measuring means for producing a signal indicating the angle of orientation $\theta$ of said moving body;

motors for displacing said moving body;

a memory for storing values indicating the desired X and Y location;

signal processing means including means for receiving the values of $\theta$, $H_x$ and $H_y$ from said orientation measuring means, and from said magnetometers and calculating values indicating the current X and Y location and comparison means for comparing the calculated and stored values and producing a signal for operating said motors to position said body at the desired X and Y location.

2. A positioning apparatus according to claim 1, wherein the said moving body is a ship and the apparatus permits dynamic anchoring of the ship and said means for producing the magnetic field are mounted on a fixed installation adjacent said ship.

3. A positioning apparatus according to claim 2, wherein said conductor wire or wires are immersed at least partly in the sea.

4. A positioning apparatus according to claim 3, wherein the magnetic field is produced by a single conductor wire, the return being effected by the sea up to a distant point.

5. A positioning apparatus according to claim 1, wherein said pair of magnetometers measure the alternating components of the magnetic field $h_x$ and $h_y$, and wherein said signal processing means includes amplifiers for receiving the signals corresponding to $h_x$ and $h_y$, filters tuned to the frequency f for receiving the amplified signals, a synchronous demodulator of $h_x$ and $h_y$, and detectors for receiving the demodulated signals and supplying signals corresponding to the amplitudes of the components $H_x$ and $H_y$.

6. A positioning apparatus according to claim 2, wherein said orientation measuring means is a gyrocompors giving the head angle $\theta$ and said receiving and calculating means produces the values of $Hx$ and $Hy$ and further includes means for supplying pairs of values for the coordinates in the fixed reference point, a coordinate changing circuit for supplying the correction values $\delta x$ and $\delta y$ to said motor, and a decision circuit for receiving the approximate position signals, and selecting the values of the coordinates X, Y from the values $X_1, Y_1$ and $X_2, Y_2$, the values of X and Y being compared with the values the values of $Xp$ and $Yp$ in said comparison means to supply the position deviation signals $\delta X$ and $\delta Y$ which are applied to the coordinate changing circuit.

7. A positioning apparatus according to claim 1, wherein said moving body comprises three pairs of magnetometers, the first being placed at the origin of the coordinates $O'$, the second on the axis $O'x$ with the abscissa $1_1$ and the third on the axis $O'y$ with the ordinate $1_2$, and the first pair of magnetometers supplies the values $H_x^{(0)}, H_y^{(0)}$, the second supplies the values $H_x^{(1)}, H_y^{(1)}$, the second supplies the values $H_x^{(1)}, H_y^{(1)}$ and the third supplies the values $H_x^{(2)}$ and $H_y^{(2)}$, these values being applied to said signal processing means comprising partial derivative calculating means for the partial derivatives:

$A_1 = \partial H_x/\partial x$, $B_1 = \partial H_x/\partial y$, $A_2 = \partial H_y/\partial x$ and
$B_2 = \partial H_y/\partial y$ and the partial derivatives:

$$a_1 = \partial x/\partial H_x, \; b_1 = \partial x/\partial H_y, \; a_2 = \partial y/\partial H_x, \text{ and}$$
$$b_2 = \partial y/\partial H_y$$

and calculating means connected to a memory circuit, receiving the values $H_x^{(p)}$ and $H_y^{(p)}$, deliver said correction signals $\delta x$ and $\delta y$ from these values and from the values $a_1$, $b_1$, $a_2$, $b_2$ and $\theta$.

8. A positioning apparatus according to claim 7, wherein the moving body is at a point $P_0$ and travelling towards a point $P_1$, and wherein said signal processing means includes a memory circuit for recording the values of the components $\Delta X$ and $\Delta Y$ of the vector $\overrightarrow{P_0 P_1}$, a calculating and control circuit for determining number of steps N, these equal steps having the components $X_1 = X/N$ and $Y_1 = Y/N$, another calculating circuit for receiving signals of the values $H_x^{(0)}$, $H_y^{(0)}$, $H_x^{(1)}$, $H_y^{(1)}$, $H_x^{(2)}$, $H_y^{(2)}$ from said calculating and control circuit and $\theta$ and the values of $A_1$, $B_1$, $A_2$, and $B_2$, and producing control signals for causing said motors to execute a step $\delta x_1$ and $\delta y_1$.

* * * * *

UNITED STATES PATENT AND TRADEMARK OFFICE
CERTIFICATE OF CORRECTION

PATENT NO. : 4,316,253
DATED : February 16, 1982
INVENTOR(S) : POSSEME

It is certified that error appears in the above—identified patent and that said Letters Patent is hereby corrected as shown below:

Please read the set of equations (4) at column 5 as follows:

$$-\frac{\partial H_x}{\partial x} = \frac{H_x^{(1)} - H_x^{(0)}}{\ell_1} = A_1$$

$$\frac{\partial H_x}{\partial y} = \frac{H_x^{(2)} - H_x^{(0)}}{\ell_2} = B_1$$

$$\frac{\partial H_y}{\partial x} = \frac{H_y^{(1)} - H_y^{(0)}}{\ell_1} = A_2$$

and

UNITED STATES PATENT AND TRADEMARK OFFICE
CERTIFICATE OF CORRECTION

PATENT NO. : 4,316,253

DATED : February 16, 1982

INVENTOR(S) : POSSEME

It is certified that error appears in the above—identified patent and that said Letters Patent is hereby corrected as shown below:

$$\frac{\partial H_y}{\partial y} = \frac{H_y^{(2)} - H_y^{(0)}}{\ell_2} = B_2 \qquad (4) --$$

Signed and Sealed this

Twenty-fourth Day of August 1982

[SEAL]

Attest:

GERALD J. MOSSINGHOFF

*Attesting Officer*  *Commissioner of Patents and Trademarks*